(12) United States Patent
Emmert

(10) Patent No.: US 6,283,462 B1
(45) Date of Patent: Sep. 4, 2001

(54) HELICAL SPRING TENSION ADJUSTER

(76) Inventor: Raymond L. Emmert, 8028 NW. 20th St., Oklahoma City, OK (US) 73127

( * ) Notice: Subject to any disclaimer, the term of this patent is extended or adjusted under 35 U.S.C. 154(b) by 0 days.

(21) Appl. No.: 09/432,720

(22) Filed: Nov. 2, 1999

(51) Int. Cl.[7] .......................................... F16F 1/06
(52) U.S. Cl. ................................. 267/72; 267/179
(58) Field of Search .................... 267/179, 180, 267/291, 169, 71.72

(56) References Cited

U.S. PATENT DOCUMENTS

| 1,965,402 | * | 7/1934 | Adelmann | 267/291 |
| 2,420,276 | * | 5/1947 | Wood | 267/72 |
| 3,902,199 | | 9/1975 | Emmert . | |
| 4,753,128 | * | 6/1988 | Bartlett et al. | 267/72 |
| 5,653,426 | * | 8/1997 | Meisel | 267/71 |

* cited by examiner

*Primary Examiner*—Matthew C. Graham
(74) *Attorney, Agent, or Firm*—Robert K. Rhea

(57) ABSTRACT

A helical spring end retainer and tension adjuster is formed by a centrally apertured relatively thin wall shallow cup-like member having a hexagonal nut axially secured in the aperture for threaded engagement with a spring surrounded rod.

8 Claims, 1 Drawing Sheet

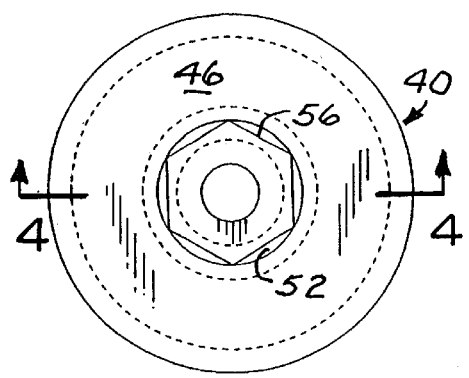
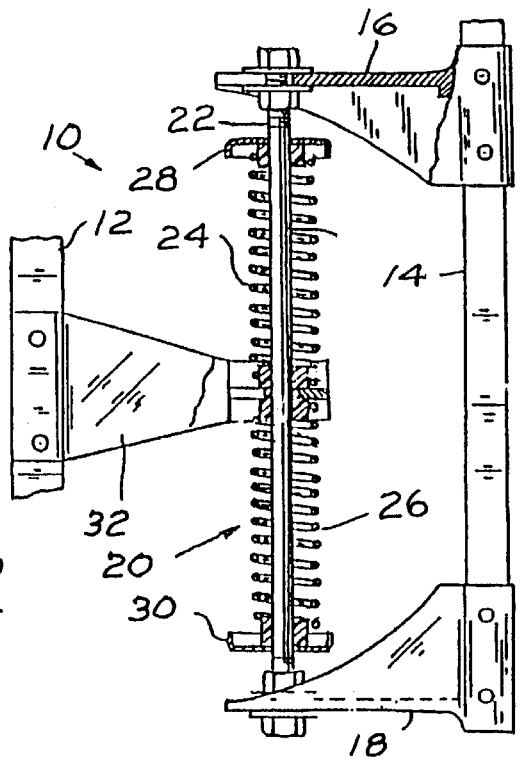
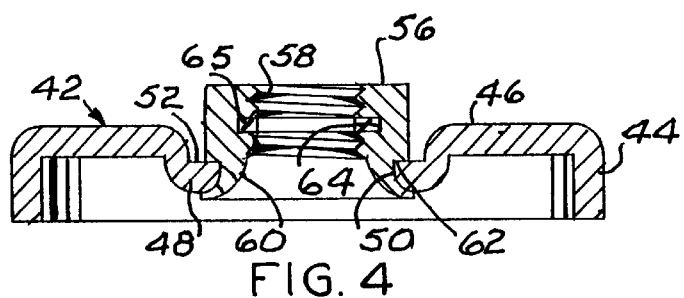
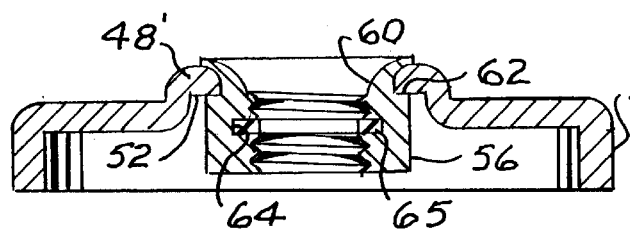
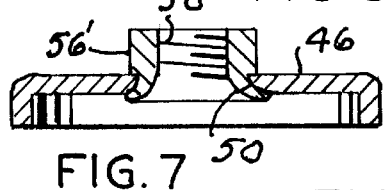
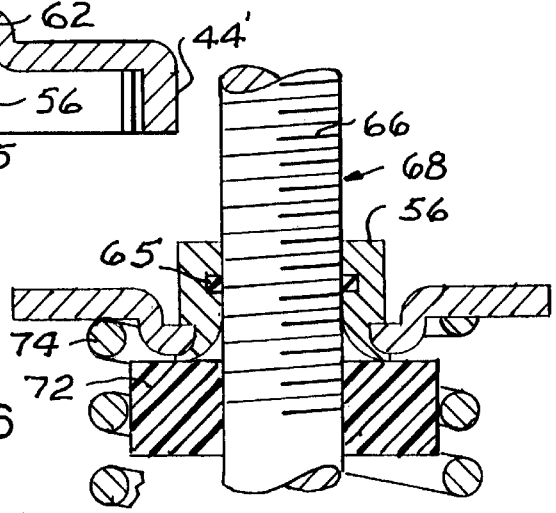

HELICAL SPRING TENSION ADJUSTER

CROSS REFERENCE TO RELATED APPLICATIONS

Not applicable.

STATEMENT REGARDING FEDERALLY SPONSORED RESEARCH OR DEVELOPMENT

Not applicable.

BACKGROUND OF THE INVENTION

The present invention relates to springs and more particularly to an end seat for a helical spring.

1. Field of the Invention

Helical springs can be either compression or expansion and this feature is frequently used in industry for various applications, e.q., a helical spring may or may not surround a rod for normally maintaining the position of devices at respective ends of the spring by adjusting the movement or expansion thereof toward or away from each other in which the respective end of the helical spring is secured by a relatively shallow cup-like socket or retainer. In such use of a helical spring, the spring surrounds a rod and the cup-like seat is used as an adjuster for varying the tension of the helical spring during the movement of an object toward or away from the end of the spring. Such cup-like seats or adjusters are usually formed by relatively thin wall material and when used around a rod to adjust the position of the spring result in very few threads engaging the exterior threads on the rod. In high tension use of a helical spring the threads may have a shorter operating life than one might wish.

This invention overcomes this problem by providing a helical spring seat and adjuster which materially increases the number of threads engaging the surrounded rod.

2. Description of the Prior Art

U.S. Pat. No. 3,902,199, issued Sep. 2, 1975, to Emmert for Stilt Device, is a typical example of the use of cup-like end plates for surrounding a rod and holding respective ends of a spring or springs in spaced relation with the fixed position with the end of the surrounded rod in which a third member, interposed between the abutted ends of the pair of springs, moves longitudinally of the rod compressing one or the other of the springs in accordance with the direction of movement of the third member.

As mentioned hereinabove this invention overcomes the problem of the failure of the spring adjuster threads, secured at a selected position on the surrounded rod, by materially increasing the effective of number threads without materially adding to the mass of the structure and thickening the length of the adjuster.

BRIEF SUMMARY OF THE INVENTION

The helical spring end seat and adjuster is formed by a centrally apertured relatively thin wall shallow cup-like member of a selected diameter. An internal helically threaded hexagonal nut is axially secured to the wall forming the aperture of the cup-like spring seat and adjuster and threadedly engages a cooperatively threaded rod having a helical spring disposed therearound.

The principal object of this invention is to improve the threaded rod gripping capacity of helical spring end seats and adjusters.

BRIEF DESCRIPTION OF THE SEVERAL VIEWS OF THE DRAWINGS

FIG. 1 is a fragmentary side elevational view, partially in section, illustrating prior art typical helical spring adjuster;

FIG. 2 is a side elevational view of a spring adjuster;

FIG. 3 is a top end view of FIG. 1;

FIG. 4 is a vertical cross sectional view, to a larger scale, taken substantially along the line of 4—4 of FIG. 3

FIG. 5 is a vertical cross sectional view of an another embodiment;

FIG. 6 is a fragmentary cross sectional view of a further embodiment; and,

FIG. 7 is a vertical cross sectional view, to a different scale, of an additional embodiment.

DETAILED DESCRIPTION OF THE INVENTION

Like characters of reference designate like parts in those figures of the drawings in which they occur.

In the drawings:

Referring more particularly to FIG. 1, the reference numeral 10 indicates forward and rearward parallel struts secured at the respective upper and lower ends to a shoe plate and a base plate, neither being shown, permitting forward and rearward movement of the shoe plate relative to the base plate in the plane of a parallelogram. A pair of spring brackets 16 and 18 are rigidly secured in vertically spaced relation to the rearward strut 14 and project laterally from there in parallel relation. A yieldable means 20 is interposed between the brackets 16 and 18. The yieldable means 20 comprises a rod 22, having respective threaded end portions extending between and secured to the brackets 16 and 18 in parallel spaced relation with respect to the strut 14. A pair of helical springs 24 and 26 surround the rod 22 in end-to-end butting relation.

A pair of centrally apertured and threaded thin wall cup-like spring retainers 28 and 30 seat the end of each spring opposite the abutted position for adjusting the tension thereof. An actuator arm 32 is rigidly secured to the forward strut 12 and is interposed between the abutted ends of the springs. When the top plate moves relative to the base plate, in either a forward or rearward direction in the plain of the parallelogram, the springs cushion this pivoting action by the actuator arm compressing the respective spring 24 and or 26 in accordance with the direction of movement of the shoe plate.

The above description of the prior art forms no part of the instant invention and is included herein as an example of the use of applicant's spring adjuster.

Referring also to FIGS. 2–6 the numeral 40 generally indicates a spring adjusting member similar to the spring adjusters 28 and 30, being formed in shallow cup fashion as indicated at 42 having a relatively short wall 44 and an end wall 46 which is relatively thin when compared with the outside diameter of the adjuster 42. The marginal portion of the end wall 46 defining the central appature 50 is offset in the direction of the cup wall 44 a distance substantially equal with the thickness of the end wall 46 to define a shoulder 52 facing opposite the longitudinal direction of the cup wall 44.

The nut 56 is provided with an annular groove 64 intermediate the length of its threads 58 for receiving an annular resilient member 65 which frictionly engages the threads 66 of a surrounded rod 68 to normally prevent angular rotation of the retainer 40 relative to the rod.

A hexagonal nut 56 having helical threads 58 and a diametrically reduced end portion defining a wall 60 having its inner surface converging opposite the direction of the remainder of the nut is disposed within the cup aperture 50 with the resulting nut shoulder 62 abutting the cup wall shoulder 52. The nut converging wall 60 portion is flared outwardly in close contact with the offset wall marginal wall portion 48 to secure the nut 56 within the aperture 50.

The periphery of the retainer 40 is provided with indentations or serrations, as at 70, for manual angular rotation of the retainer in adjusting spring tension.

Obviously the retainer side wall 44 may extend in the opposite direction, as illustrated by FIG. 5. In this embodiment the marginal surface 48' is offset in a direction opposite the direction of the side wall 44'.

The a retainer side wall 44 maybe omitted, as illustrated by FIG. 6. When using this embodiment it is preferred that a spring retainer guide 72 having an inside diameter snugly received slideably by the periphery of the rod 68 and an outside diameter frictionally engaging the inside diameter of one or more convolutions of a helical spring 74 to maintain the spring axially centered with respect to the rod 68.

Referring more particularly to FIG. 7, it seems obvious that the marginal edge of the cup end wall 46 defining the opening 50 need not be offset, space permitting, and that a nut 56' having standard threads 58' may be similarly secured to the wall edge 50.

Obviously the invention is susceptible to changes or alterations without defeating its practicability. Therefore, I do not wish to be confined to the preferred embodiment shown in the drawings and described herein.

I claim:

1. A retainer for a helical spring having opposite ends and surrounding a rod having threaded end portions, comprising:
   a cup-like member having a planar bottom and a marginal edge and a centrally located aperture and having a side wall,
     said side wall being formed from relatively thin material when compared with the diameter of said member,
   the marginal edge of said bottom wall adjacent the aperture being axially offset with respect to the plane of the bottom wall a distance substantially equal with the thickness of the bottom wall; and,
   a nut having screw threads and having a diametrically reduced end portion forming an annular shoulder intermediate its ends seated on said bottom wall marginal edge and extending through and secured in the aperture forming the bottom wall aperture.

2. The retainer according to claim 1 and further including:
   an annular resilient member transversely intersecting said screw threads.

3. The retainer according to claim 2 in which said marginal edge is offset in a direction toward the side wall.

4. The retainer according to claim 2 in which said marginal edge is offset in a direction opposite the side wall.

5. A retainer for a helical spring having opposite ends and surrounding a rod having threaded end portions, comprising:
   a centrally apertured plate including a cup-like member having a planar bottom, a marginal edge and a centrally located aperture and having a side wall,
   the marginal edge of said plate adjacent the aperture being axially offset with respect to the plane of the plate for forming an annular shoulder adjacent the aperture; and,
   a nut having screw threads and having a diametrically reduced end portion forming an annular shoulder intermediate its ends seated on said plate shoulder and extending through and secured in the aperture forming the bottom wall aperture.

6. The retainer according to claim 5 and further including:
   an annular resilient member transversely intersecting said screw threads.

7. The retainer according to claim 6 and further including:
   an annular spring retainer guide having a predetermined outside diameter and surrounding said rod adjacent said nut.

8. A retainer for a helical spring having opposite ends and surrounding a rod having threaded end portions, comprising:
   a cup-like member having a planar bottom defining a marginal edge and having a centrally located aperture and having a side wall,
     said side wall being formed from relatively thin material when compared with the diameter of said member, and,
   a nut having screw threads and having a diametrically reduced end portion forming an annular shoulder intermediate its ends seated on said bottom wall marginal edge and extending through and secured in the aperture formed in the bottom wall.

* * * * *